(12) United States Patent
Tajima et al.

(10) Patent No.: US 7,106,475 B1
(45) Date of Patent: Sep. 12, 2006

(54) IMAGE PROCESSING APPARATUS

(75) Inventors: Katsuaki Tajima, Toyokawa (JP);
Takayuki Nabeshima, Toyokawa (JP);
Toshio Tsuboi, Okazaki (JP); Junji Nishigaki, Toyokawa (JP); Daisetsu Tohyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 940 days.

(21) Appl. No.: 09/662,819

(22) Filed: Sep. 15, 2000

(30) Foreign Application Priority Data

Sep. 17, 1999 (JP) ................................. 11-262905

(51) Int. Cl.
*G06F 15/00* (2006.01)
*H04N 1/46* (2006.01)

(52) U.S. Cl. ..................... 358/1.9; 358/501; 358/539

(58) Field of Classification Search ................. 358/1.9, 358/1.1, 1.2, 1.15, 1.13, 501, 504, 520, 523, 358/539, 448, 530; 382/162, 167
See application file for complete search history.

(56) References Cited

U.S. PATENT DOCUMENTS

| | | | | |
|---|---|---|---|---|
| 5,181,105 A | * | 1/1993 | Udagawa et al. | 358/520 |
| 5,751,326 A | * | 5/1998 | Bernasconi | 347/115 |
| 5,754,746 A | * | 5/1998 | Blurfrushan et al. | 358/1.15 |
| 5,930,468 A | * | 7/1999 | Zingher et al. | 358/1.16 |
| 6,256,462 B1 | * | 7/2001 | Maeda et al. | 399/71 |
| 6,321,266 B1 | * | 11/2001 | Yokomizo et al. | 709/226 |
| 6,373,586 B1 | * | 4/2002 | Kim | 358/1.15 |
| 6,763,135 B1 | * | 7/2004 | Tohyama et al. | 382/167 |
| 6,891,639 B1 | * | 5/2005 | Nabeshima et al. | 358/1.9 |

FOREIGN PATENT DOCUMENTS

| | | |
|---|---|---|
| JP | 5-167839 | 7/1993 |
| JP | 7-287748 | 10/1995 |
| JP | 8-111786 | 4/1996 |
| JP | 9-214790 | 8/1997 |
| JP | 9-312777 | 12/1997 |

* cited by examiner

*Primary Examiner*—Madeleine AV Nguyen
(74) *Attorney, Agent, or Firm*—McDermott Will & Emery LLP

(57) ABSTRACT

An image processing apparatus is provided in which the frequency of undesired delay of the image output can be reduced. The image processing apparatus comprises an image processor for performing a process defined by a parameter on the image data of the received job, a decision portion for deciding a state of the image data of the received job, and a controller for setting a parameter in accordance with the state that is decided by the decision portion if an interval between the received job and the previously received job is longer than a predetermined time, and for setting the parameter that was used in the last job despite the state that is decided by the decision portion if the interval is not longer than the predetermined time.

9 Claims, 4 Drawing Sheets

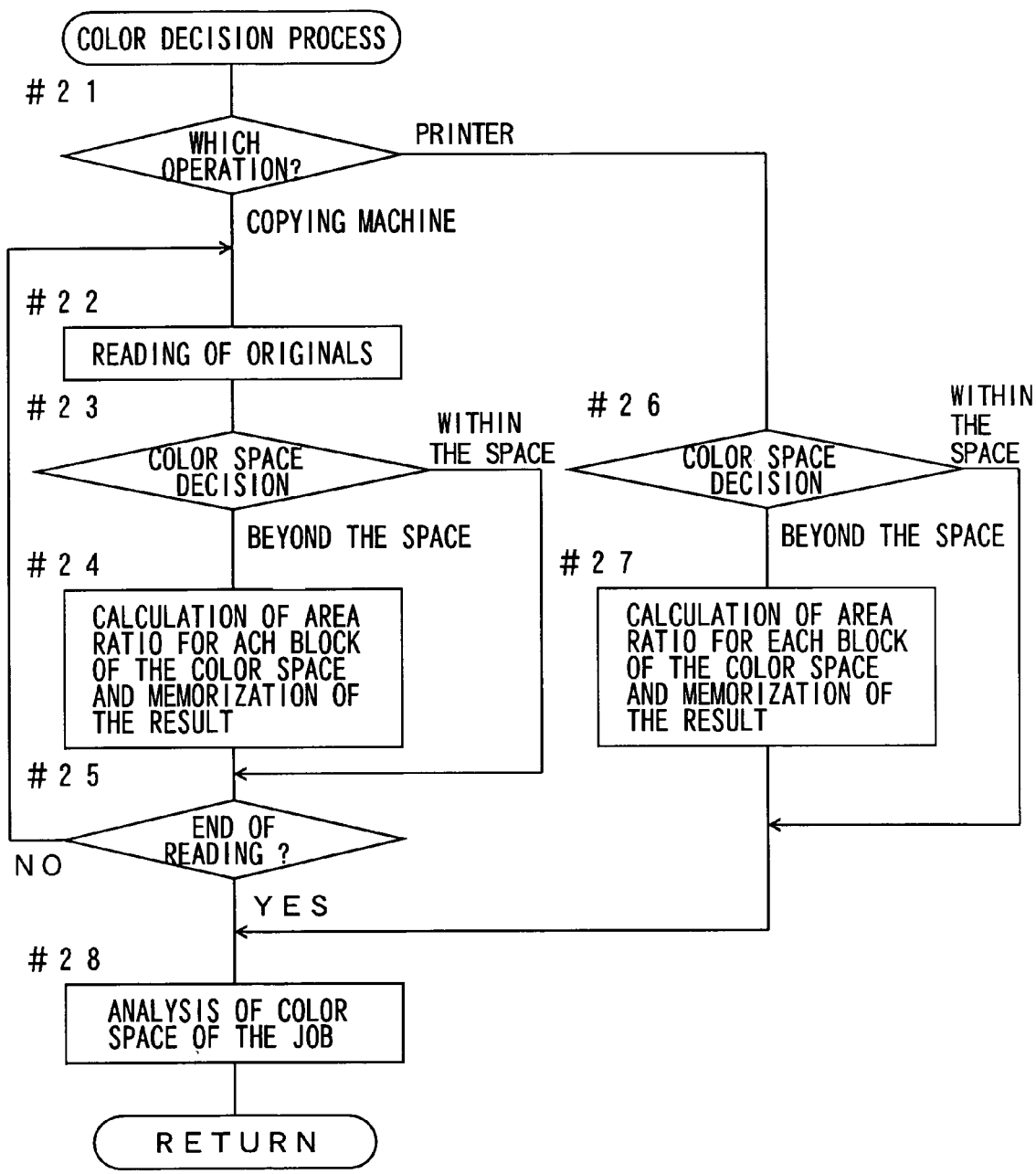

IMAGE PROCESSING APPARATUS

This application is based on Japanese Patent Application No. 262905/1999 filed on Sep. 17, 1999, the contents of which are incorporated herein by reference.

BACKGROUND OF THE INVENTION

1. Field of the Invention

The present invention relates to an image processing apparatus for outputting an image by a printer or a display.

2. Description of the Prior Art

When printing out an image read by a color scanner or a computer graphics, a color compressing process is performed as necessary, in which colors of the image data are converted into colors within a color reproduction range of the printer.

Conventionally, a parameter for realizing the optimal color compression (including incompression) is set at every input of a job to an image output device (a request for output one or more pages).

In order to decide whether the color compression is necessary or not so as to set the parameter, an appropriate time is required, which causes a delay of the image output. Conventionally, there was a problem that the parameter setting causes the delay of the image output even if a reconfiguration of the parameter is not necessary. For example, there is a waste of time when a user confirms the result of a trial print and then instructs a real print promptly, or when a user finds a shortage of the number of copies and instructs the print of the deficient number of copies, or when instructing a continuous output (job) of plural documents having similar colors.

SUMMARY OF THE INVENTION

The object of the present invention is to provide an image processing apparatus that can reduce a frequency of the undesired delay of the image output.

According to a first aspect of the present invention, an image processing apparatus receives a job including image data and processes the image data of the received job so as to give the job to an output device. The image processing apparatus comprises an image processor for performing a process defined by a parameter on the image data of the received job, a decision portion for deciding a state of the image data of the received job, and a controller for setting a parameter for the received job in accordance with the state that is decided by the decision portion if an interval between the received job and the last job is longer than a predetermined time, and for setting the parameter, that was used in the last job, for the received job despite the state that is decided by the decision portion if the interval is not longer than the predetermined time.

According to a second aspect of the present invention, an image processing apparatus receives a job including image data and processes the image data of the received job so as to give the job to any one of plural output devices. The image processing apparatus comprises an image processor for performing a process defined by a parameter on the image data of the received job, an interface for giving the image data processed by the image processor to any one of the plural output devices, a decision portion for deciding a state of the image data of the received job, and a controller for setting a parameter in accordance with the state that is decided by the decision portion.

According to a third aspect of the present invention, an image processing method, which is used for performing an image process defined by a parameter on image data, comprises the steps of receiving a job including image data, deciding a state of the image data of the received job, setting a parameter in accordance with the state decided by the deciding step if the interval between the received job and the last job is longer than a predetermined time, while setting the parameter that was used in the last job despite the state that is decided in the deciding step if the interval is not longer than the predetermined time, and performing a image process defined by a parameter on image data of the received job.

BRIEF DESCRIPTION OF THE DRAWINGS

FIG. 4 is a flowchart of the color decision process shown in FIG. 3.

DESCRIPTION OF THE PREFERRED EMBODIMENTS

Hereinafter, the present invention will be explained more in detail with reference to embodiments and drawings.

Figure 1:
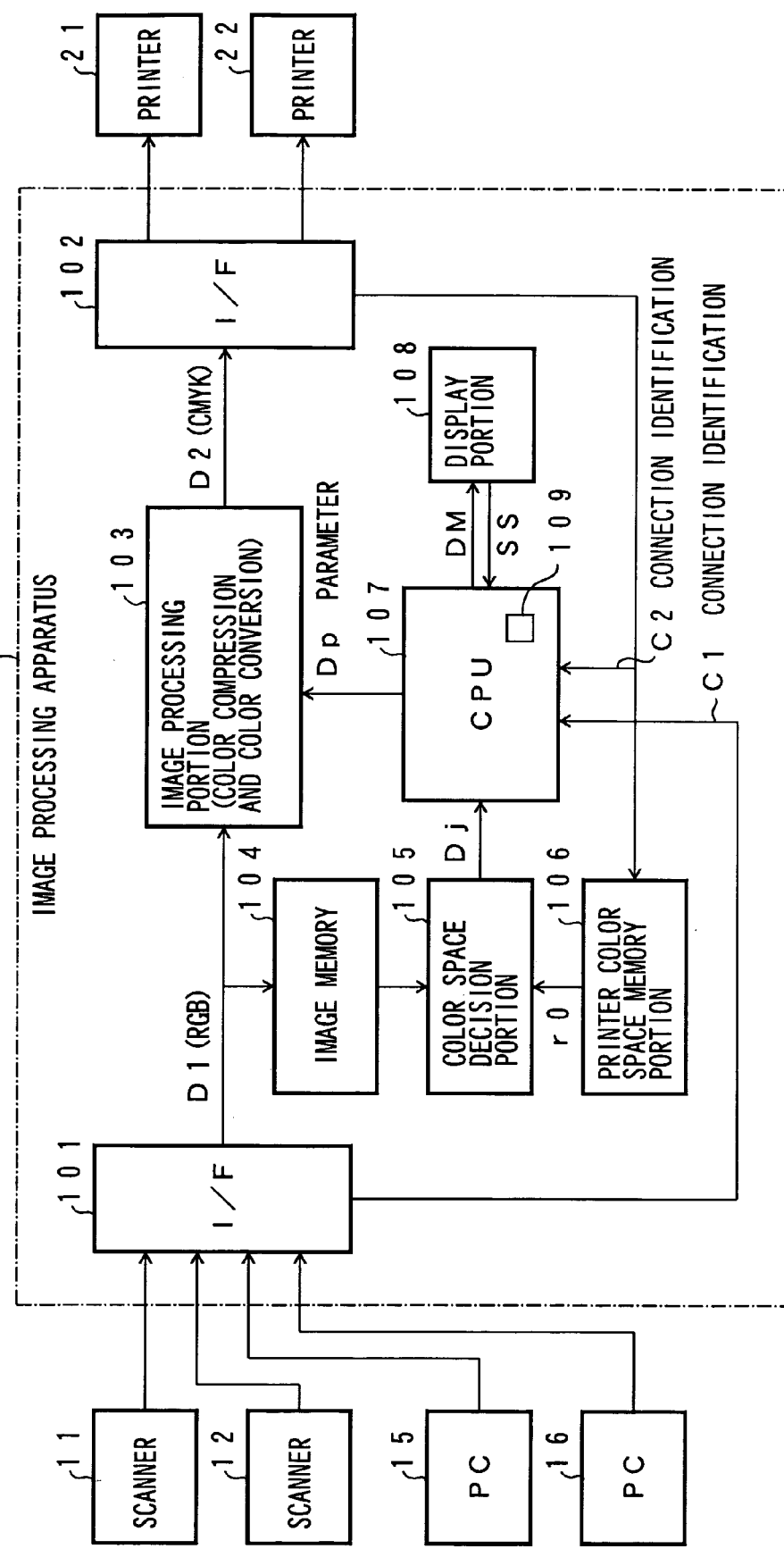
FIG. 1 is a block diagram showing the entire structure of an image output system according to the present invention.

FIG. 1 is a block diagram showing the entire structure of an image output system according to the present invention.

The image output system 1 is a network system that includes scanners 11 and 12 and computers 15 and 16 as image input devices, printers 21 and 22 as image output devices, and an image processing apparatus 100. The image output system 1 is used for copying an original or for printing a document made by using the computers 15 and 16. The scanners 11 and 12 and the computers 15 and 16 output image data in the RGB color space. The printers 21 and 22 perform color printing by a subtractive process of CMYK. Since the image processing apparatus 100 is connected to four image input devices and two image input devices, the image output system 1 has eight (4×2) combinations of input and output devices. If the scanners 11, 12 and the printers 21, 22 have fixed correspondence, there are six combinations. In any case, one of the combinations is selected by the image processing apparatus 100 for each job.

The image processing apparatus 100 has an interface 101 for selecting an input and an interface 102 for switching the output target. The interface 101 selects one image input device that requested a job and does not receive any job request from the other image input device until the job is completed. The interface 102 selects one of the printers 21 and 22 as the output target in accordance with the job that the interface 101 received. These interfaces 101 and 102 send connection identifications C1 and C2 that indicate the selected state to the CPU 107.

As an example of the job, copying of plural originals by the scanner 11 and the printer 21 will be adopted in the following explanation of the image processing apparatus 100. The scanner 11 reads images of plural originals set on a table (not shown) sequentially and sends the image data to the image processing apparatus 100. The interface 101 sends input data from the scanner 11 as the image data D1 to be processed to an image memory 104. The image memory 104 memorizes all image data D1 concerning the present job temporarily. In parallel with this memorizing, the image data D1 of each page are sent from the image memory 104 to a color space decision portion 105 sequentially. The color space decision portion 105 is supplied from a printer color space memory portion 106 with data that indicate a color reproduction range r0 of the printer 21 selected by the interface 102. The color space decision portion 105 decides whether a color range of the image data D1 of each page is partially out of the color reproduction range r0 or not. The detail of the decision will be explained later. In accordance with the decision result Dj, the CPU 107 sets a parameter Dp that defines process contents of an image processing portion 103. The image processing portion 103 can perform an image improving process such as a color conversion from RGB to CMYK or, a γ correction or an edge emphasis, and a color compression on the image data D1 read out of the image memory 104. Since the CPU 107 set the parameter by a job unit, the color compression is not performed for the image data D1 of all pages of one job. Otherwise, the color compression is performed uniformly for the image data D1 of all pages of one job. The output (i.e., the image data) of the image processing portion 103 is sent to the printer 21 via the interface 102. The time point when the image data D2 of all pages are sent out completely is the end of the job in the image processing apparatus 100.

The image processing apparatus 100 decides whether the color compression is necessary or not for every job input except the "specific case" and sets a parameter Dp in accordance with the decision result Dj so as to perform the image processing. The "specific case" includes, e.g., the case where a new job is inputted during a predetermined period of maintaining the state from the end of a job and the combination of input and output devices concerning the latest job is the same as the last job. In this case, the color space decision portion 105 does not work substantially, and the CPU 107 sets a parameter Dp that was adapted by the last job to the image processing portion 103. Namely, it is regarded that the state of the color display has not changed, so the parameter Dp is not changed. For the image data D1 of the latest job, the image processing portion 103 performs the process having the same contents as the last job. Since the decision of the necessity of the color compression and the determination of the optimum parameter Dp can be omitted, the image process can be started early, so that the time required for the job can be shortened.

The set parameter Dp is memorized by the non-volatile memory 109 of the CPU 107 along with management data DM for distinguishing the job such as the date and time, the input image number and the input device name.

During the period of waiting for the input of job, the CPU 107 instructs a list display of the stored management data DM to a display portion 108. The display portion 108 is a user interface having an input key. The display portion 108 displays the management data DM and reports the operation input contents SS to the CPU 107. When the user selects the management data DM (i.e., the job in the past), the CPU 107 read the parameter Dp corresponding to the selected management data DM out of the memory 109 so as to give the data to the image processing portion 103. In this case too, the decision of the necessity of the color compression for the image data D1 is omitted.

If a structure is adapted in which a predetermined specific parameter (e.g., a parameter having the largest setting frequency in the past) is automatically selected and set when the state maintaining time passes from the end of a job, the opportunity that the user does not need to perform the selection increases depending on the using state. The state maintaining period can be adjusted by the user and be set for each kind of the job (a copy or a print) independently.

Figure 2:
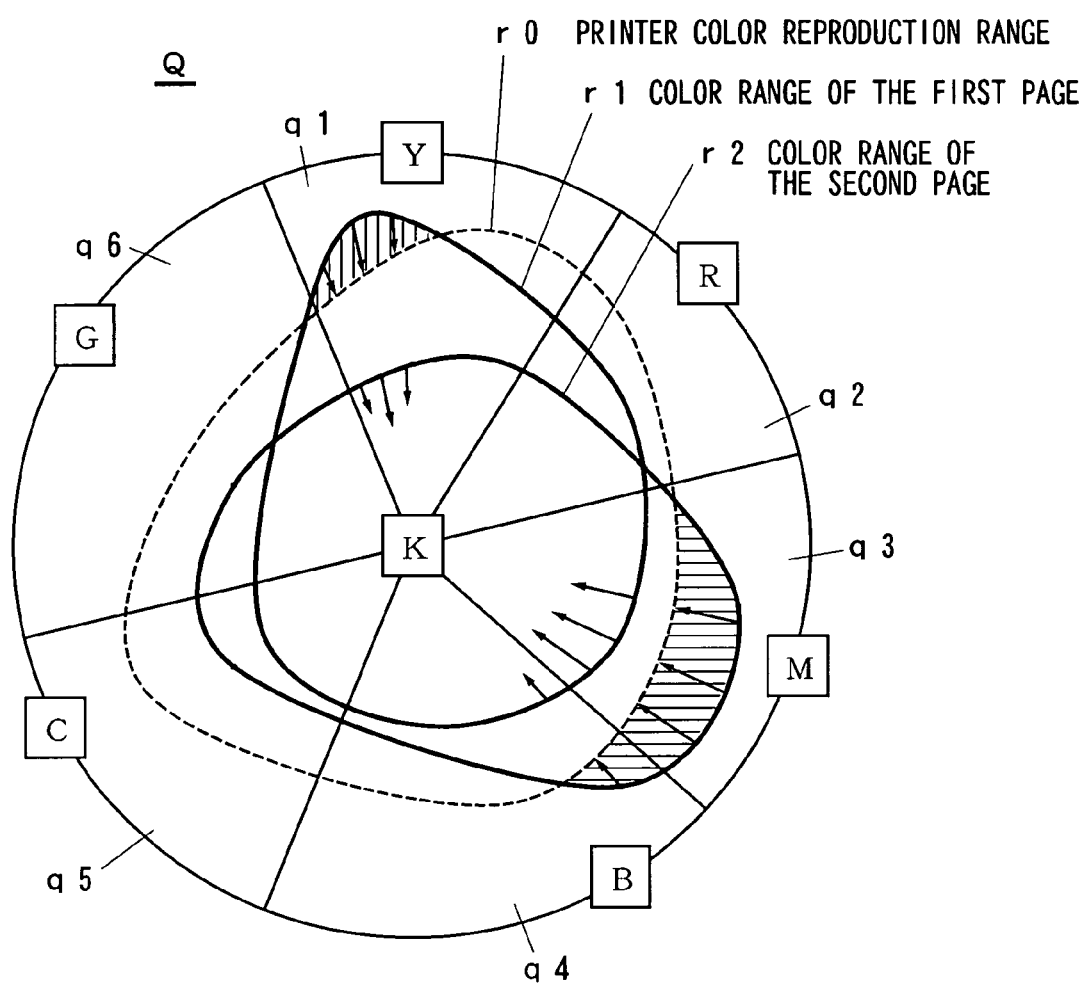
FIG. 2 is a schematic drawing of the color compression.

FIG. 2 is a schematic drawing of the color compression.

The above-mentioned color space decision portion 105 converts the RGB image data D1 into data in a standard color space (e.g., a CIELAB color space) and decides whether the color of pixel of each page is a color within the color reproduction range r0 of the printer regarding each of blocks q1–q6 that are generated by dividing the standard color space Q by a predetermined number (six in this example) in accordance with the tint. The color space decision portion 105 sends data as a decision result Dj to the CPU 107. The data indicate the ratio of the number of pixels which are out of the printer color reproduction range to the number of pixels in each block q1–q6 (the area ratio). The CPU 107 memorizes the decision result Dj that is given for each page, decides the necessity of the color compression for each block in accordance with the decision result Dj of one job, and calculates a parameter Dp, which is given to the image processing portion 103. In the example shown in FIG. 2, the color range r1 of the first page is partially out of the color reproduction range r0 in the block q1. The color range r2 of the second page is partially out of the color reproduction range r0 in the blocks q3 and q4. In this case, as shown by arrows in FIG. 2, the image processing portion 103 performs the color compression of converting the color of the image data D1 of the portion of the first page that corresponds to block q1 into a color within the color reproduction range r0 and performs the similar color compression for the blocks q3 and q4. In the same way, the image processing portion 103 performs the color compression of the image data D1 of the second page about the blocks q3 and q4, as well as about the block q1.

Figure 3:
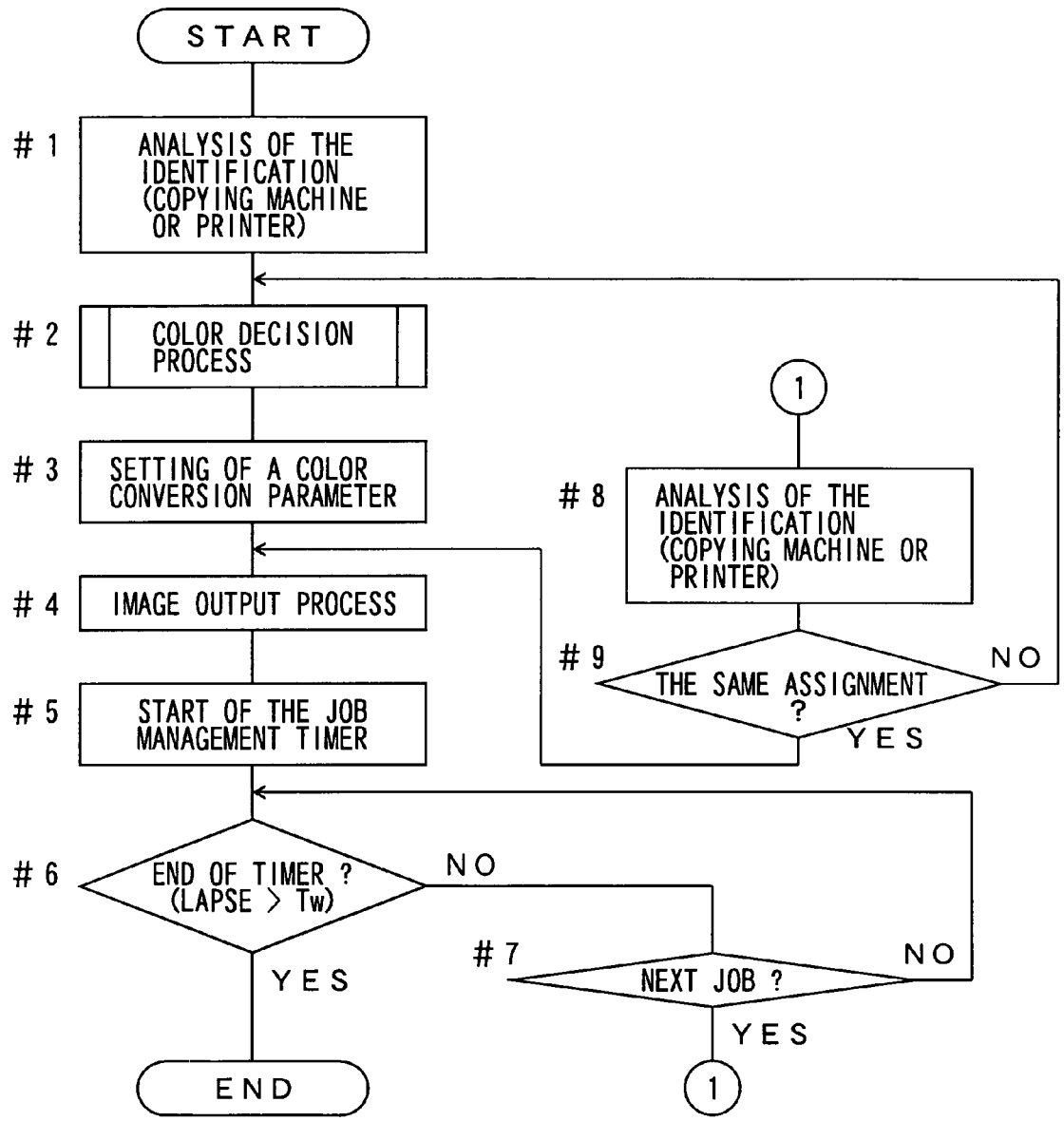
FIG. 3 is a flowchart showing a general operation of the image processing apparatus.

FIG. 3 is a flowchart showing a general operation of the image processing apparatus.

When a job is inputted in the waiting state, the connection identifications C1 and C2 are analyzed for determining a combination of the input and the output devices and the color reproduction range r0 (#1). The color decision process is performed for examining the relationship between the color range of the image data D1 and the color reproduction range r0 of the printer (#2). A parameter Dp that is suitable for the job is set in accordance with the information obtained in the color decision process (#3), and the image data D1 is converted into image data D2 that is suitable for the reproduction thereof so as to output the data (#4). A job management timer is set for measuring the state maintaining period Tw (#5). If the next job is inputted before the end of the timer, the connection identifications C1 and C2 are analyzed so as to check whether the combination of the input and the output devices is different from the last job (#6–#9). If the assignments are the same, the image output process is performed promptly (#9, #4). If the assignments are different, the color decision process is performed, and the parameter Dp is reset so as to perform the image output process (#9, #2).

FIG. 4 is a flowchart of the color decision process shown in FIG. 3.

First, the kind of the job is checked (#21). If it is a copy job, image data D1 of one page are fetched in synchronization with the reading of originals by scanners 11 and 12, and the above-mentioned area ratio is calculated for each block of the color space Q (#22–#24). When the calculation of the area ratio is finished for all pages by repeating the data fetch (#25), the cumulative value of the area ratio is analyzed for all pages, and the necessity of the color compression is decided for each block (#28). In the case of the print job, in the same way as in the copy job, the area ratio is calculated for each page in the image data D1 that are inputted as a unit for one job, the area ratios of all pages are accumulated, and the cumulative value is analyzed so as to decide whether the color compression is necessary or not for each block (#26–#28).

According to the above-mentioned embodiment, if at least one page of image data is data that are partially out of the printer color reproduction range, the color compression is performed uniformly on the image data D1 of all pages of the job. Therefore, in contrast to the case where the color compression is performed or not performed for each page, the tint of the reproduction color is not different among pages. If a user selects the job in the past by observing the displayed management data DM, the parameter can be set indirectly. Therefore, the user can obtain a printed result having the same color reproducibility as the printed result in the past.

In the above-mentioned embodiment, the system has a configuration in which the scanner and the printer are separated. However, the present invention can be applied to a copying machine that has a single unit of scanner and printer. In this case, the image processing apparatus 100 is built in the copying machine, and an operation panel of the copying machine may work as the display portion 108.

The kinds and the numbers of the image input devices and the image output devices are not limited to the example of the above-mentioned embodiment. If there are plural image output devices, it is possible that the user selects one output device using the display portion 108. The dividing number of the color space Q is not limited to six. It is possible to decide whether the color compression is necessary or not without dividing the color space Q.

According to the present invention, the frequency of undesired delay of the image output can be reduced.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An image processing apparatus for receiving a current job including image data and for processing the image data of the current job so as to give the current job to an output device, the image processing apparatus comprising:
   an image processor for performing a process defined by a parameter on the image data of the received job;
   a decision portion for deciding a state of the image data of the current job;
   a controller for setting the parameter for the current job in accordance with the state that is decided by the decision portion if an interval between the receipt of the current job and completion of an immediately preceding job is longer than a predetermined time and for setting the parameter that was used in the immediately preceding job, for the current job if the interval is not longer than the predetermined time;
   a memory for memorizing the set parameter set by the controller along with control information thereof; and
   a user interface for selecting operation of the parameter memorized in the memory, wherein the controller sets the selected parameter to the image processor when the selecting operation is performed by the user interface,
   the controller sets a specific parameter to the image processor when a predetermined time passed after the completion of the current job, and
   the specific parameter is the parameter that has the largest set frequency among the parameters memorized in the memory.

2. The image processing apparatus according to claim 1, wherein the decision portion decides whether the image data of the current job are data within a predetermined color range.

3. An image processing apparatus according to claim 2, wherein the image processor performs a color compression of the image data of the current job in accordance with the set parameter.

4. The image processing apparatus according to claim 2, wherein the decision portion performs the decision for the image data of all pages included in the current job.

5. The image processing apparatus according to claim 4, wherein the image processor performs the color compression of the image data of all pages included in the current job in accordance with the set parameter when it is decided by the decision portion that image data of at least one page are out of the predetermined color range.

6. The image processing apparatus according to claim 1, wherein the predetermined time is variable.

7. An image processing method for performing a image process defined by a parameter on image data, the image processing method comprising the steps of:
   receiving a current job including image data;
   deciding a state of the image data of the received job;
   setting a parameter in accordance with the state decided by the deciding step if the interval between the receipt of the current job and completion of an immediately preceding job is longer than a predetermined time, while setting the parameter that was used in the immediately preceding job if the interval is not longer than the predetermined time;
   memorizing the set parameter along with control information thereof;
   performing an image process defined by the parameter on image data of the current job; and
   setting a specific parameter for the image process when a predetermined time passed after the completion of the current job, wherein
   the specific parameter is the parameter that has the largest set frequency among memorized parameters.

8. The image processing method according to claim 7, wherein the deciding step includes the step of deciding whether image data of the current job are data within a predetermined color range.

9. The image processing method according to claim 8, wherein the image process performing step includes the step of performing a color compression on image data of the current job in accordance with the set parameter.

* * * * *